United States Patent

[11] 3,576,132

| [72] | Inventor | Stefan Kotoc<br>Prague, Czechoslovakia |
|---|---|---|
| [21] | Appl. No. | 875,149 |
| [22] | Filed | Nov. 10, 1969 |
| [45] | Patented | Apr. 27, 1971 |
| [73] | Assignee | Ustav pro vyzkum motorovych vozidel<br>Prague, Czechoslovakia |
| [32] | Priority | Nov. 14, 1968 |
| [33] | | Czechoslovakian |
| [31] | | PU7754-68 |

[54] GAS DIVERTING MECHANISM
9 Claims, 6 Drawing Figs.

[52] U.S. Cl. ..................................................... 73/421.5,
73/422
[51] Int. Cl. ..................................................... G01n 1/22
[50] Field of Search ........................................... 73/421.5,
424, 425.2 (Inquired), 425.4, 422

[56] References Cited
UNITED STATES PATENTS

| 2,322,018 | 6/1943 | Huber | 73/422X |
|---|---|---|---|
| 2,370,260 | 2/1945 | Robison | 73/422 |
| 3,060,746 | 10/1962 | Gompper | 73/422 |
| 3,188,565 | 6/1965 | Kolb | 73/422UX |
| 3,202,348 | 8/1965 | Strohmaier | 73/421X |

*Primary Examiner*—Louis R. Prince
*Assistant Examiner*—William A. Henry, II
*Attorneys*—Richard Low and Murray and Schaffer

ABSTRACT: Diverting apparatus for gases helically flowing in pipelines comprising at least one annular chamber located exteriorly of the pipeline having a conduit extending into the pipeline. The conduit having an annular inlet concentric with the axis of the pipeline.

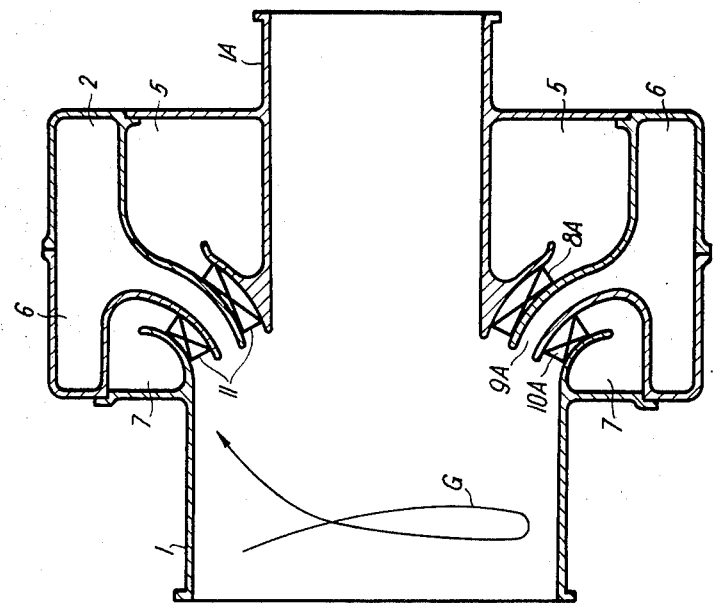
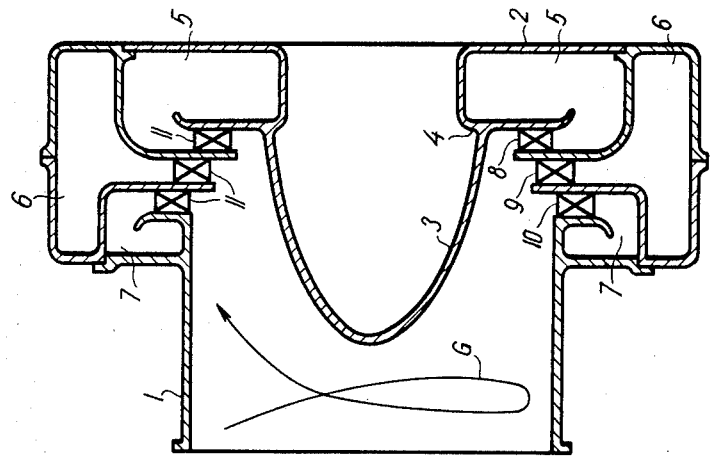

Stefan Kotoč
INVENTOR

BY Murray Schaffer
ATTORNEY

GAS DIVERTING MECHANISM

BACKGROUND OF THE INVENTION

The present invention relates to apparatus for diverting gases from a conduit, and in particular, to a device for obtaining samples of gases flowing within conduits or pipelines.

Many devices such as turbines, cyclone chambers and jet engines produce streams of gases, the characteristics of which are extremely important and require either continual or periodic monitoring. For example, it is often important to determine the pressure, temperature and/or speed of gases as they flow in order to determine whether the gas can be made use of as, for example, a heating source, a jet power propulsion source or for some other use.

In normally flowing systems, the gases move substantially axially of the pipeline in a rather uniform and homogeneous manner and may be sampled by simply inserting a probe into the conduit. However, gases from turbines, cyclone or jet engines do not flow in normal fashion but flow helically with an extremely strong rotary or circular component. This circular component tends to stratify the gas and produce layers concentrically about the axis of the conduit. Each of the layers vary in speed, temperature, density and other characteristic factors. Additionally, certain gases are nonhomogeneous and tend to stratify even when not helically flowing.

The conventional probe cannot be used in rotary flowing gases or in stratified gases since such probes tend to disturb the flow producing turbulence and effects the aerodynamic nature of the gas. In stratified gases, stratification would be destroyed by the conventional probe so that it would be thereafter impossible to obtain an accurate sampling of any of the individual layers. Furthermore, the conventional probe is only able to determine a single portion or point in the pipeline and so will only be able to sample a single layer at a time and could not sample simultaneously each of the stratified layers.

It is an object of the present invention to provide means for obtaining samples of flowing gases which gases have both an axial and a substantial rotary component.

It is a further object of the present invention to provide apparatus for sampling flowing gases which eliminates the deficiencies and disadvantages of prior art probes.

It is another object of the present invention to provide a device for the sampling of flowing and rotating gases which reduces to a minimum any loss of the kinetic energy of the gas and reduces to a minimum any disturbance of the aerodynamic nature of the gas.

It is a specific object of the present invention to provide a gas diverting means which is simple and inexpensive and may be used with virtually any flowing gas system.

These and other objects together with numerous advantages will be seen from the following disclosure.

SUMMARY OF THE INVENTION

According to the present invention, there is provided apparatus for diverting gas flowing in a helical direction in a pipeline comprising at least one annular chamber located at the exterior of the pipeline, an annular conduit inserted into the pipeline having an inlet concentric with the axial flow of gas, the conduit directing a portion of the gas to the exterior chamber where it is maintained in at least circular flow.

In one embodiment, a plurality of chambers and associated conduits are used to divert gases at different layers.

Flow direction devices such as baffles may be employed to maintain uniform flow.

In another embodiment, the conduit comprises a plurality of ducts, the inlets of which are contiguously arranged annularly about the axis.

A full and detailed description of the present invention and various embodiments will be found in the following disclosure.

BRIEF DESCRIPTION OF THE DRAWINGS

In the following disclosure, reference is made to the accompanying drawings in which:

FIG. 1 is a schematic view showing an embodiment employing the principles of the present invention;

FIG. 2 is a schematic view showing another embodiment employing the present invention;

DESCRIPTION OF THE INVENTION

Figure 5:
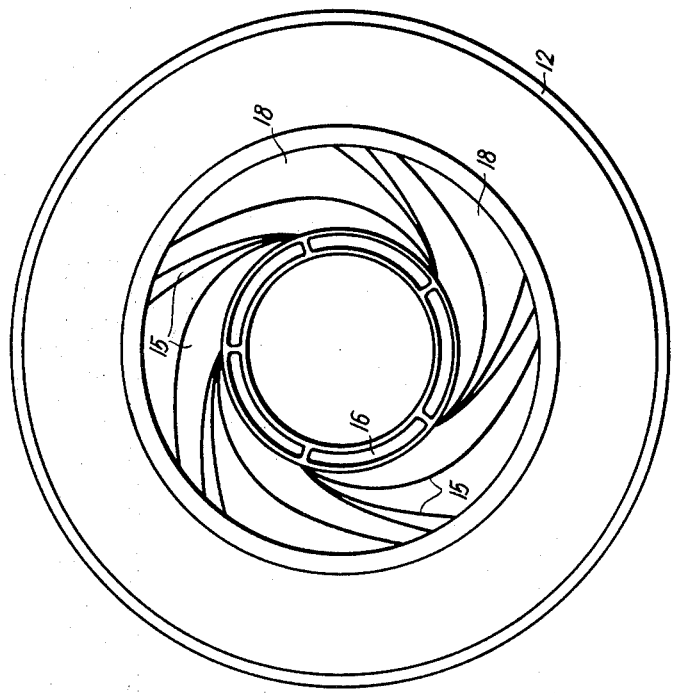
FIG. 5 is an end view from the left of the device shown in FIG. 3.

Turning first to a general understanding of the FIGS., it will be observed that the apparatus is depicted in all its embodiments schematically and diagrammatically in cross-sectional view in a plane through the central axis X-X of a conduit or pipeline. The conduit and pipeline are shown as circular and therefore the representations of the apparatus embodying the present invention are also circular or annular and that the views are depicting members generated about the central axis X-X. Various components of a gas conduit system such as the gas producing means, i.e., turbine or generating system, valves, etc., or other consumption devices are not shown and only that portion of the conduit or pipeline which is necessary for an understanding of the present invention is. The elements not depicted in the FIGS. are conventional in nature and will be well known to those skilled in this art.

Turning now to FIG. 1, the principles of the present invention are shown applied to apparatus for diverting gas flowing through a pipeline 1 having a relatively low axial or linear speed component with respect to its rotary or tangential component depicted by the arrow G which, as observed, takes a helical path. It is assumed that the flowing gas is stratified into three layers. While the helical flow of the gas is depicted by the arrow G, it will be appreciated that the gas as a whole moves together with its linear component along the pipeline in the direction of its central axis X-X, from left to right as seen in the FIGS.

Because of the low linear speed of the gas, the embodiment shown in FIG. 1 is formed as a cap or terminus for the conduit pipeline 1 and comprises an annular housing 2 which may be screwed or otherwise fastened to the end of the pipeline. Extending inwardly into the pipeline is a dome-shape member 3 integral at its base 4 with the housing 1. The dome-shaped member 3 with the centrifugal force acts to divert all of the gases radially outward of the pipeline and it is shaped in a predetermined manner to effect this diversion without changing the stratified nature of the gas or creating any turbulence or disturbance within the pipeline.

The housing 2 is provided with three annular or spiral chambers 5, 6, and 7 which are arranged independent of each other in suitable conventional fashion outside the perimeter of the pipeline 1. The chambers 5, 6, and 7 are each provided with an annular inlet 8,9, and 10 communicating with the interior of the pipeline or conduit 3. The inlets 8, 9, and 10 are arranged concentrically about the axis X-X and serially along the axial extension of the pipeline so that when the gas is diverted by the dome 3, each layer of gas seeks to enter only a predetermined one of the inlets. Located within each of the inlets 8, 9, and 10 are ring shaped diffuser elements 11.

The chambers 5, 6 and 7 serve as header members directing the flow of gas to a suitable use such as a combustion chamber or merely to exhaust. The outlet from the chambers are not shown although it should be obvious that conventional gate valves, orifices, etc. may be employed. At this point, it will be observed that each of the chambers 5, 6 and 7 comprises an individual conduit for the flow of a portion of the gas flowing through the pipeline 1. The portion flowing in each of the chambers 5, 6 and 7 comprises uniformly the gas from a single layer or stratification of the initial gas flow. Because the chambers 5, 6 and 7 are disposed about the entire periphery of the pipeline 1, substantially all of the gases in the pipeline can be diverted into their respective chambers.

The use of diffuser elements 11 are preferred since they function to convert the kinetic energy of the gas into pressure energy creating a pressure head at the entrances to the chambers 5, 6 and 7. They may, however, be omitted if it is desired to maintain the gas flow and pressure of the pipeline through the chambers 5, 6 and 7. The diffuser elements 11 preferably comprise a plurality of curved baffle plates, or similar wall-like members, spaced from each other and arranged in ringlike formation circumferentially about the annular inlet. The purpose of bafflelike diffusers is to divert the gas in a uniform manner.

The inlets 8, 9 and 10 are disposed substantially normal to or perpendicular to the axis X-X of the pipeline in order to advantageously obtain the benefit of the high tangential component of the flowing gas. Since under such circumstances the actual axial flow rate is small, the dome 3 and the inlet 8, 9 and 10 are sufficient to maintain the flow into the respective chambers without disturbance or turbulence.

Having now obtained within each of the chambers 5, 6 and 7 an independent flow of gas representative of the three stratifications of the initial gas, each of the gases can now be analyzed independently of each other by conventional means. The conventional means may consist of probes, pressure sensing devices, chemical analysis mechanisms which either extend into or are in communication with the chambers 5, 6 and 7 in a conventional and well-known manner.

FIG. 2 shows a second embodiment of the present invention for gases flowing through a pipeline in which the linear or axial flow component is of a greater degree than the subject gas flow of FIG. 1. When this occurs, it may be advantageous to make use of this linear gas flow and rather than diverting it all to a sampling chamber, a major portion may be allowed to flow directly out of the pipeline 1 where it might be put to use as a power source. The embodiment of the present invention is, on the other hand, similar to that shown in FIG. 1 and comprises a housing 2 in which three annular chambers 5, 6 and 7 are also provided. It will be noted that the shape of the chambers and housing in the embodiment shown in FIG. 2 differs from that shown in FIG. 1. This is merely a design option and is depicted in the drawings to indicate the various modifications which may be made employing the principles of the present invention. Returning to FIG. 2, each of the chambers 5, 6 and 7 are also provided with their inlets 8a, 9a, and 10a. In this embodiment, only the inlets 8a and 10a are provided with the diffuser elements 11, the central chamber having its inlet 9a free and open. Inlet channel 9a of the chamber 6 may be diffuser shaped, even if no blades are provided.

It will also be observed that the inlet openings 8a, 9a and 10a are set at a relatively acute angle with regard to the axis X-X of the pipeline. Since the tangential flow of gases in the device of FIG. 2 is not as great relative to the axial or linear flow of the gases in the device of this FIG. 1, the inlets 8a, 9a, and 10a are thus set at a predetermined angle to the perpendicular to X-X so that the gases will flow without disturbance and without turbulence into the annular chambers.

It will also be noted that the inlets 8a, 9a, and 10a, as shown in FIG. 2, extend within the interior of the pipeline 1. The degree to which these inlets extend within the pipeline is predetermined to the type of gases flowing therethrough and the depth of each of the layers created by the gas. It will, of course, be obvious that the extent will vary with respect to different gases and different functions.

Since a portion of the gas flow is diverted into chambers 5, 6 and 7, the volume of gas exiting from the pipeline 1 is considerably reduced, and accordingly, it may be preferred to provide the exit with a reduced pipeline or conduit 1a. In this manner, with the reduction of volume, the speed or velocity of the gas may be maintained. The size of the reduction in the pipeline will, of course, be predetermined. A variable orifice may also be provided.

In FIGS. 3 through 6, still another embodiment of the present invention is shown wherein apparatus may be provided for removing gas from a particular predetermined layer without disturbing the through flow of the remaining gases. By this device, selective sampling can be obtained.

An annular housing 12 similar to the housings 2 (previously depicted in FIGS. 1 and 2) is provided. The housing 13, however, is provided with only a single annular chamber 13. Communicating with the single chamber 13 is a plurality of curved ducts 14 each formed from curved bladelike members 15 (FIG. 5) having relatively thick walls as needed. The blade members have an inlet opening 16 and an outlet opening 17 and are so shaped that they form overall a configuration similar to the vortex of a rotating fluid; their inlet openings 16 being located concentrically about the central axis X-X within the pipeline in a substantially contiguous ring as seen in FIG. 5; their outlet openings curving radially outwardly in an arc to open into the annular chamber 13. The size of the blades and the depth at which the inlet openings 16 are located within the pipeline 1 is, of course, determined by the depth of which the layer selected for sampling is located.

Figure 4:
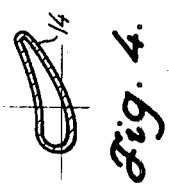
FIG. 4 is a sectional view along lines 4-4 of FIG. 3.
Figure 3:
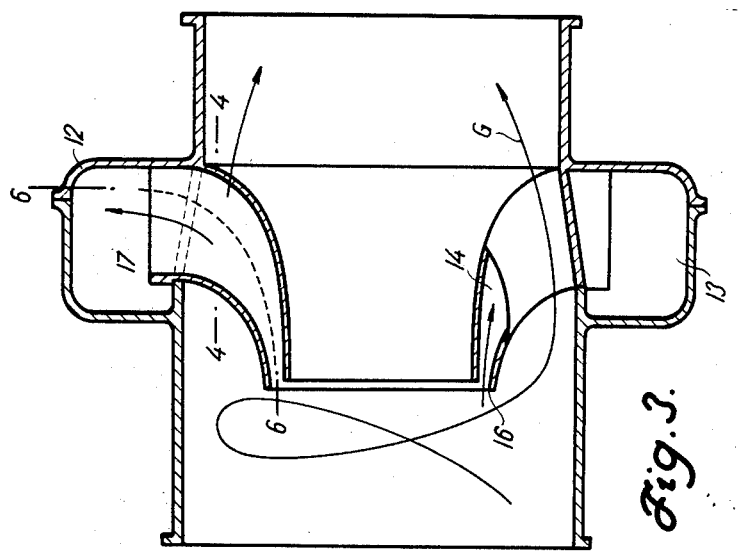
FIG. 3 shows still a third embodiment employing the principles of the present invention.
Figure 6:
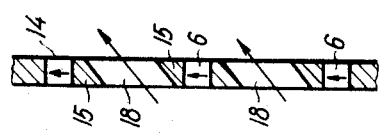
FIG. 6 is a sectional view taken along lines 6-6 of FIG. 3.

The space 18 between the ducts 14 (FIG. 6) remains axially free so that the gas not diverted into the chamber 13 can pass freely through the pipeline 1. The size of the ducts 14 are, of course, chosen to conform to the velocity and temperature of the flowing gas and the other factors involved therein. As shown in FIG. 4, it is preferable that the ducts 14 have a compound curved cross section which as seen in FIG. 5 curves from the narrow opening at the inlet 16 to a relatively wide and elongated opening 17 in the chamber 13.

The ducts 14 are in the embodiment shown fixed in position at a given radius from the center of the pipeline X-X; however, it will be obvious to those skilled in the art that they may be mounted movably as an iris so that their distance from the central axis may be radially varied so as to be able to obtain and sample the flowing gas at any layer within the pipeline.

FIGS. 1 and 2 indicate the sampling of a gas having three layers and is provided, therefore, with three concentric gas inlets. It will be obvious that the number of inlets can be varied depending upon the number of stratifications found in the gasflow. Certainly as shown in FIGS. 3 through 6, a single gas layer may be sampled. In a like manner, an indefinite plurality of samples may be taken.

It will be seen that in each of the embodiments shown, the inlet is oriented so that it is positioned counter directionally to the fluid flow, and is provided with means whereby the flow is moved without disturbance or turbulence directly into the fluid inlet. Further, each inlet communicates with an annular chamber or header in which the particularly sampled gas is directed. The header or chamber is located outside of the pipeline and in no way interferes therewith and is adapted so that the sampled gas flows therethrough in a uniform manner.

A number of advantages will be obvious from the foregoing description among which is the fact that it is possible to withdraw a layer or a plurality of layers from a rotating gas fluid at any selected depth without influencing the flow of the gas or creating turbulence within the conduit. Consequently, the gas flowing in the pipeline may be continued onward to its ultimate destiny or use or it may be diverted wholly or in major portion to various uses and/or analyzing mechanisms.

The apparatus is simple, it has no moving parts and may be made of any material consonant with the type of gas including metals, plastics and similar malleable materials.

In view of the many modifications and changes shown, the present disclosure is to be taken illustrative only of the principles of the present invention and not limiting thereof.

I claim:

1. Apparatus for diverting gases from a pipeline, said gas having a rotating or centrifugal component, comprising an annular chamber located exteriorly of said pipeline, a conduit communicating with said chamber and extending within the interior of said pipeline, said conduit having an annular opening substantially concentric with said pipeline whereby said gas is diverted from within said pipeline to said chamber.

2. The apparatus according to claim 1 including a plurality of annular chambers located exteriorly of said pipeline, each having an associated conduit, the annular openings of which being arranged concentrically about the axis of said pipeline whereby gas at separate radial distances from the axis of said pipeline may be diverted.

3. The apparatus according to claim 2 including flow direction means located in said annular opening to divert the gas in a uniform manner.

4. The apparatus according to claim 3 wherein the flow direction means comprise a plurality of curved baffles circumferentially arranged within the annular opening.

5. The apparatus according to claim 2 wherein at least one of said chambers comprises a header for directing the gas therein to a further use.

6. The apparatus according to claim 4 wherein said baffles are spaced uniformly to provide axial openings therebetween to permit gas to flow therethrough.

7. The apparatus according to claim 2 including cap means for sealing the end of the pipeline, said cap means being shaped so as to divert the entire gas flow into said annular chambers.

8. The method of sampling helically flowing gas in a pipeline, comprising the steps of inserting in said pipeline an annular conduit having an opening concentric to said pipeline, directing gas entering said conduit in uniform manner to an annular chamber exteriorly of said pipeline and analyzing the gas contained in said annular chamber while maintaining at least circular flow of said gas in said chamber.

9. The method according to claim 8 wherein said gas flows in stratified layers, including the steps of providing a plurality of conduits each inserted in the pipeline at a predetermined layer and associated with a corresponding one of a plurality of chambers concentrically arranged exteriorally of the pipeline.